Sept. 1, 1953  L. B. GILCREST  2,650,711
WATER CLEANING APPARATUS
Filed June 27, 1951  5 Sheets-Sheet 1
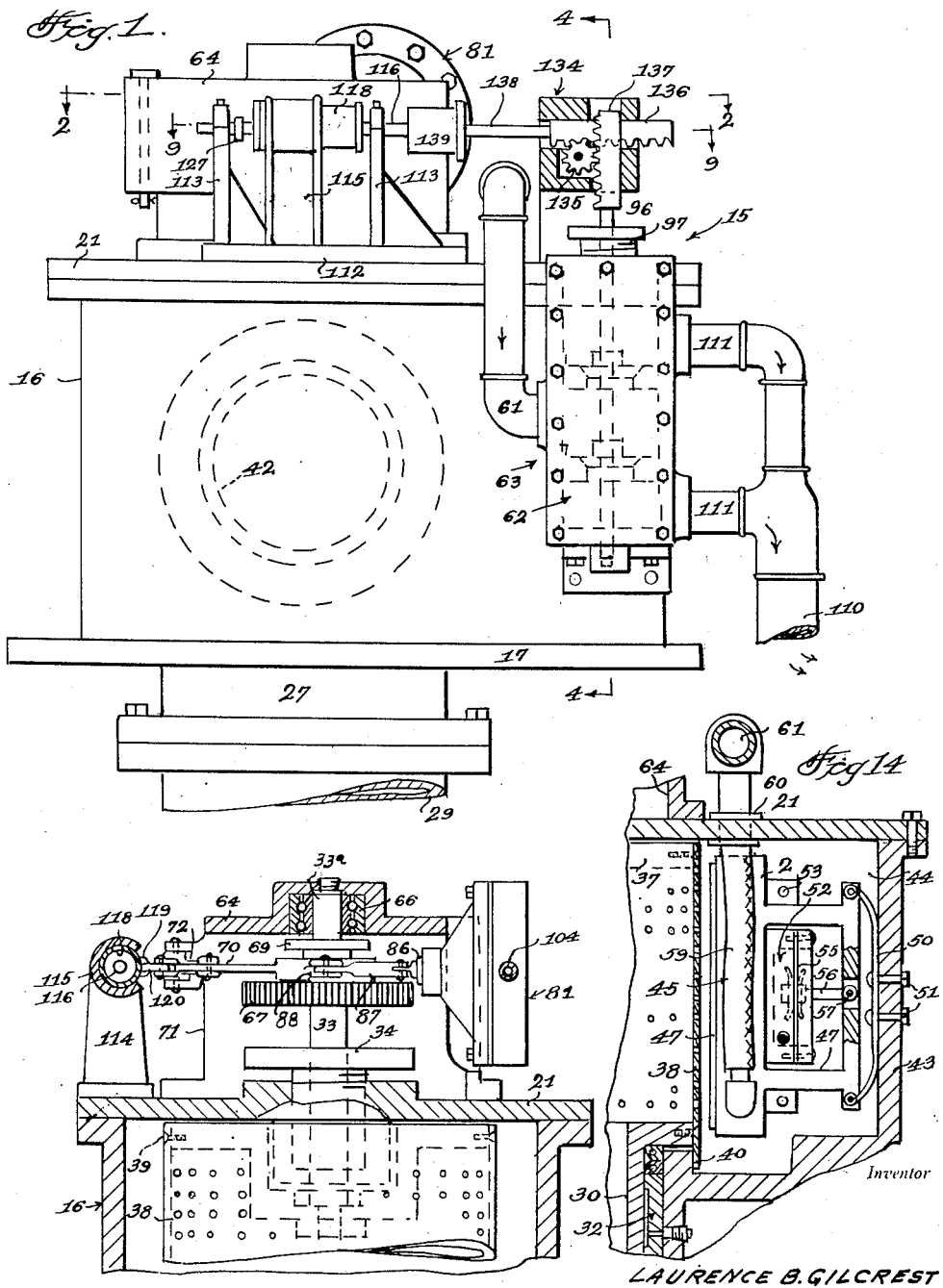
Inventor
LAURENCE B. GILCREST
By John N. Randolph
Attorney

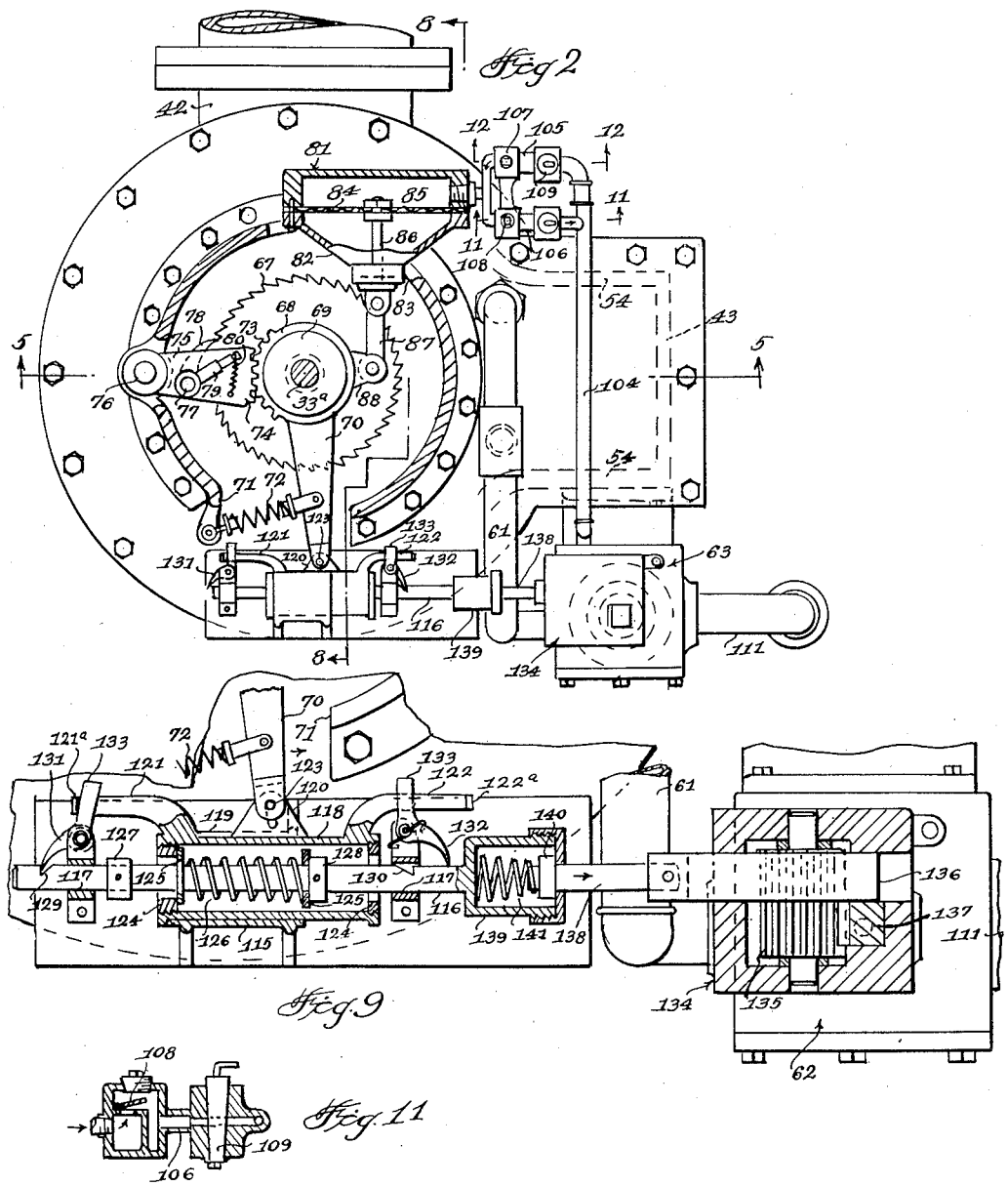

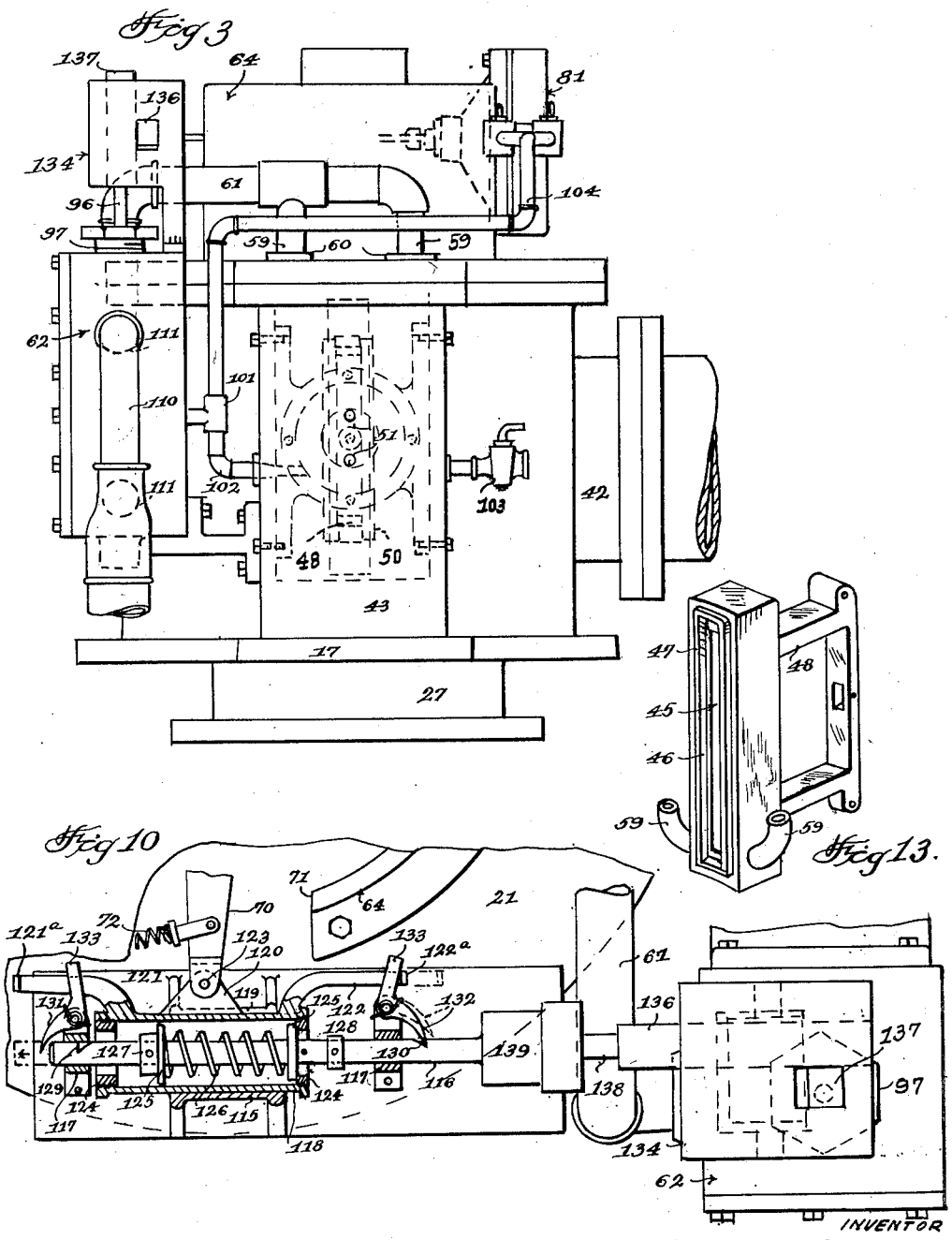

Sept. 1, 1953 L. B. GILCREST 2,650,711
WATER CLEANING APPARATUS
Filed June 27, 1951 5 Sheets-Sheet 4
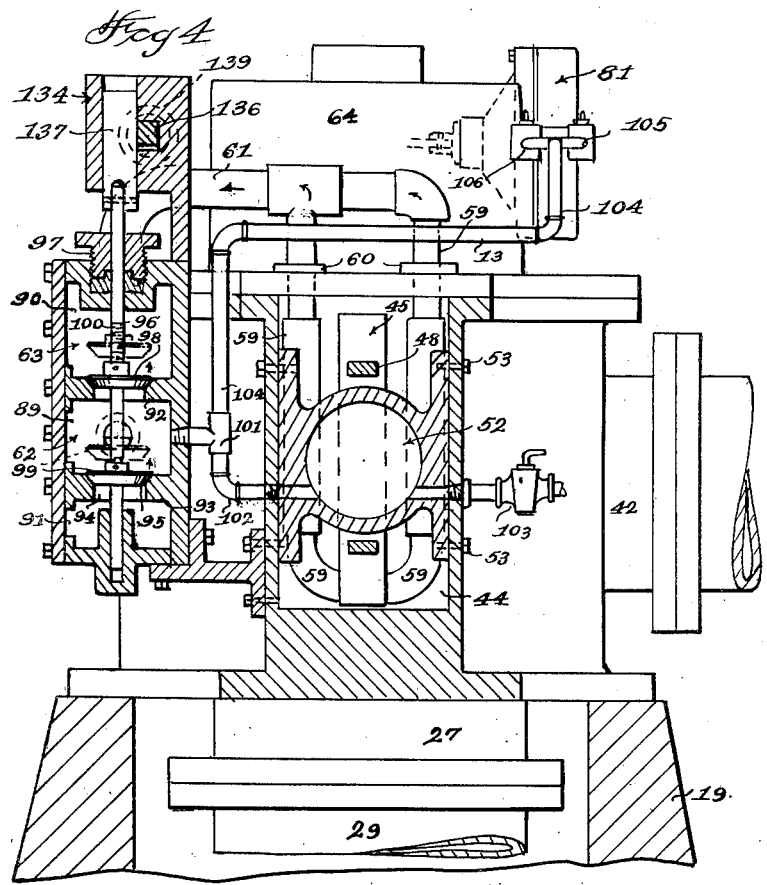
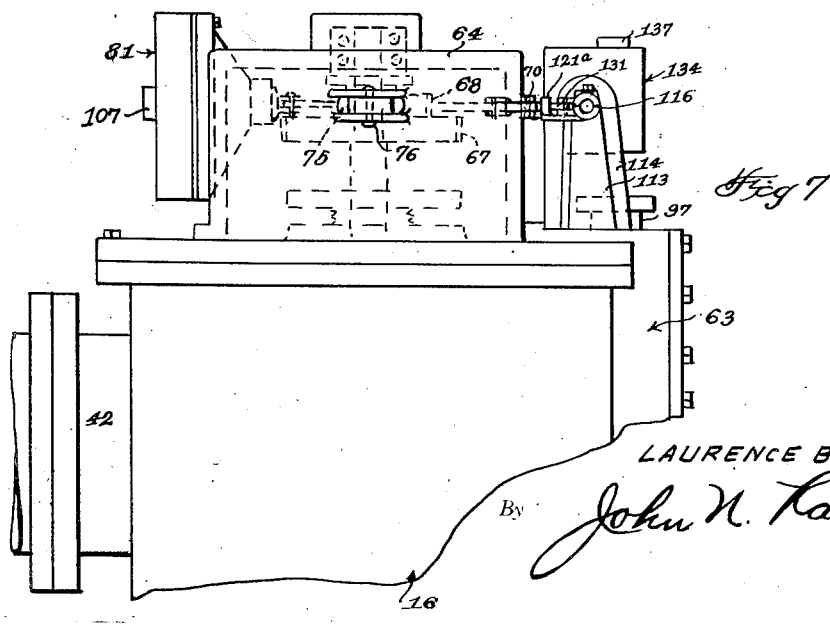
Inventor
LAURENCE B. GILCREST
By John N. Randolph
Attorney Inventor
LAURENCE B. GILCREST
By John N. Randolph
Attorney Patented Sept. 1, 1953

2,650,711

UNITED STATES PATENT OFFICE 2,650,711

WATER CLEANING APPARATUS

Laurence B. Gilcrest, Irondale, Ohio

Application June 27, 1951, Serial No. 233,863

10 Claims. (Cl. 210—167)

This invention relates to a novel apparatus of relatively simple construction for cleaning or straining water during its passage through a water supply system under pressure, such as for mills, power plants, and other industrial users.

More particularly, it is an aim of the present invention to provide a strainer through which the water is required to pass under pressure and through which a part of the cleaned water is caused to backwash outwardly of the strainer into a chamber possessing substantially no pressure for cleaning a portion of the strainer through which the clean strained water is backwashed.

A further object of the invention is to provide means for moving different portions of the strainer intermittently and successively into a position to be contacted by the backwash receiving chamber of very low pressure so that the water strainer will be maintained at all times in a relatively clean condition and prevented from becoming clogged.

Still a further object of the invention is to utilize the pressure of the water passing through the cleaning apparatus for at least providing in part the power source for operating the apparatus to effect the intermittent cleaning of segments of the strainer.

Still a further object of the invention is to utilize the water pressure to at least in part provide the power source for intermittently moving the screen or strainer in one direction to successively position different segments thereof in a position to be contacted by the backwash receiving chamber.

Various other objects and advantages of the invention will hereinafter become more fully apparent from the following description of the drawings, illustrating a presently preferred embodiment thereof, and wherein:

Figure 1 is a side elevational view, partially in vertical section of the water cleaning apparatus;

Figure 2 is a horizontal sectional view thereof taken substantially along a plane as indicated by the line 2—2 of Figure 1;

Figure 3 is a side elevational view looking from right to left of Figure 1;

Figure 4 is a vertical sectional view taken substantially along a plane as indicated by the line 4—4 of Figure 1;

Figure 7 is a fragmentary side elevational view of the upper portion of the apparatus looking from left to right of Figure 1;

Figure 8 is a fragmentary vertical sectional view taken substantially along a plane as indicated by the line 8—8 of Figure 2;

Figure 9 is an enlarged fragmentary horizontal sectional view taken substantially along a plane as indicated by the line 9—9 of Figure 1;

Figure 10 is a fragmentary horizontal sectional view partly in top plan similar to Figure 9 and showing a different position of certain of the parts;

Figures 11 and 12 are fragmentary vertical sectional views taken substantially along planes as indicated by the lines 11—11 and 12—12, respectively, of Figure 2;

Figure 13 is a perspective view of one part of the apparatus, and

Figure 5:
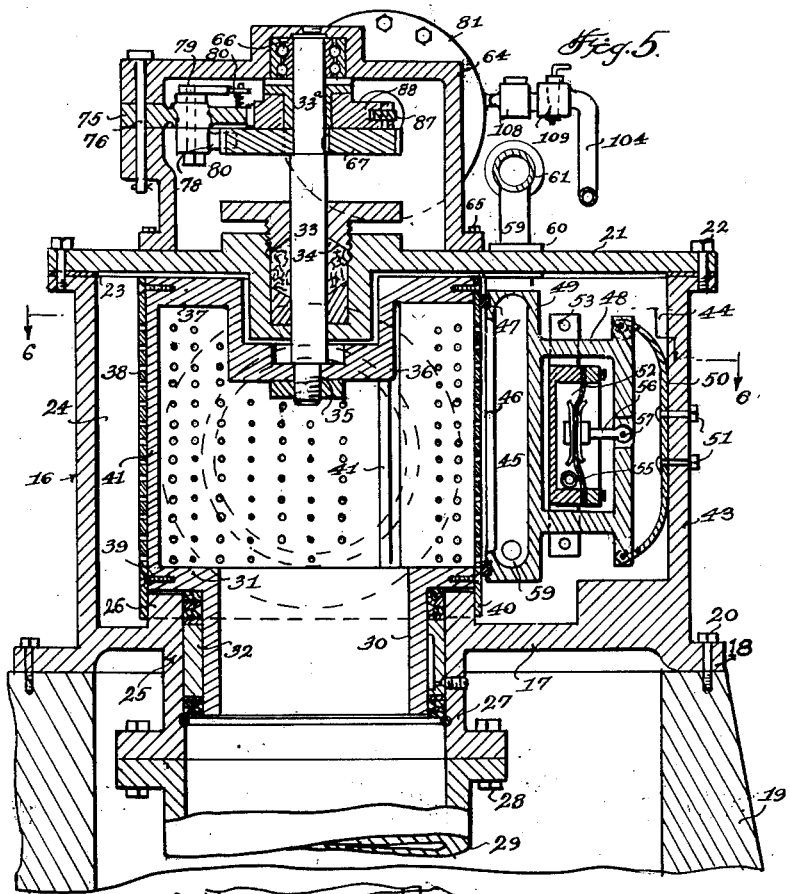
Figure 5 is a vertical, central sectional view taken substantially along a plane as indicated by the line 5—5 of Figure 2.
Figure 6:
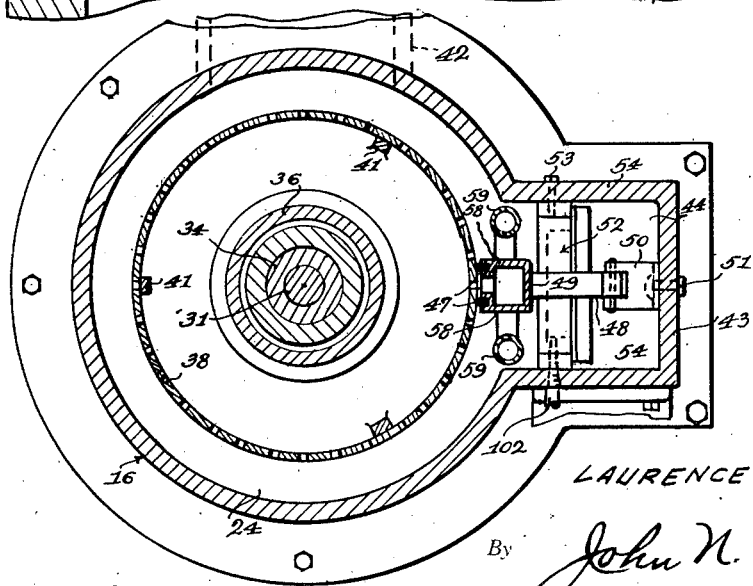
Figure 6 is a horizontal sectional view of the internal portion of the apparatus taken substantially along a plane as indicated by the line 6—6 of Figure 5.

Figure 14 is a fragmentary vertical sectional view similar to a portion of Figure 5 but showing the backwash chamber in a retracted position.

Referring more specifically to the drawings, the water cleaning apparatus in its entirety is designated generally 15 and includes a relatively large chamber, designated generally 16 which is preferably disposed in an upright position and which preferably includes an integral bottom 17 having a marginal flange 18 which is adapted to be supported on the upper end of an annular supporting member 19 and secured thereto by fastenings 20. The casing 16 is provided with a removable top wall 21 which is retained in an applied position by fastenings 22. A sealing gasket 23 is provided for sealing the top wall 21 on the casing 16 so that pressure may be maintained within the casing chamber 24.

The bottom wall 17 is provided with an annular flanged opening 25, the flange of which includes an upstanding flange portion 26 and a depending flange portion 27. The flange portion 27 is secured by fastenings 28 to a conduit 29 which may form a main line of a water supply system under which water is maintained under pressure and thus supplied to consumers.

A sleeve 30 is journaled in the flange opening 25 and has an outturned annular flange 31 at its upper end which is rotatably disposed over the upstanding flange portion 26. A bearing bushing and suitable grease seal, designated generally 32, is accommodated between the flange 25 and the sleeve 30. A drive shaft 33 extends downwardly into the casing 16 and is journaled in a stuffing box 34 formed in the top wall 21. The shaft 33 is disposed axially of the sleeve 30 and is nonrotatably secured as seen at 35 at its lower end to a downwardly offset central portion 36 of a disk 37. A substantially cylindrical strainer or screen 38 is disposed within the chamber 24 with the upper end thereof positioned around the periphery of the disk 37 and secured thereto and a portion adjacent the lower end of said screen member 38 being disposed around the periphery of the flange 31 and likewise secured thereto, in each case as by fastenings 39. The screen member 38 may constitute a perforated cylindrical piece of sheet metal wherein all of the perforations are disposed between the flange 31 and disk 37 and the lower imperforate bottom edge portion thereof forms an apron 40 which is disposed rotatably around the upstanding flange portion 26 to prevent any escape of water beneath the flange 31 and between the flange 25 and sleeve 30. Likewise, the strainer or screen 38 may be formed of mesh wire fabric and in which case the flange 31 and disk 37 are connected by a plurality of rigid ribs 41 so that torque will not be transmitted from the disk 37 to the mesh wire fabric screen. However, if the screen 38 is formed of sheet metal the ribs 41 may be omitted.

As seen in Figures 2 and 7, the casing 16 is provided with an inlet 42 in the side thereof through which water is adapted to be supplied under pressure from a supply source, such as a reservoir, to fill the chamber 24 around the strainer 38 which is spaced from all portions of the sides of said casing and particularly from a portion of the casing which is spaced from the inlet 42 and which casing portion 43 in combination with the strainer 38 forms an enlarged chamber portion 44.

A backwash chamber 45 is disposed in the casing chamber 44 and has an open front 46 facing a portion of the strainer 38 and disposed outwardly thereof. A gasket 47 is secured to and projects from the open front portion of the chamber 45 which surrounds and defines the opening 46. A yoke 48 is fixed to and projects from the opposite closed rear portion 49 of the chamber 45 and is connected to the ends of a spring 50. The intermediate portion of the spring 50 is secured by fastenings 51 to a portion of the side wall of the casing 16 defining the chamber 44 and which is disposed remote to the strainer 38. The spring 50 is biased toward a straight position and accordingly urges the chamber 45 away from and out of engagement with the strainer 38.

The yoke 48 is disposed loosely around a first diaphragm chamber 52 which is rigidly supported within the chamber 44 by fastenings 53 which are secured to wall portions 54 of the casing 16, which are disposed at right-angles to the wall portion 43. The diaphragm 55 of the diaphragm chamber 52 faces the wall portion 43 and has a rod 56 projecting outwardly therefrom and which is connected at 57 to an intermediate portion of the yoke 48, which is disposed between the diaphragm 55 and wall portion 43.

The opposite side walls 58 of the chamber 45 each have an end of a flexible but noncollapsible conduit portion 59 connected thereto. The conduit portions 59 open into the chamber 45 adjacent its lower end and extend upwardly through the top wall 21 and are secured and sealed therein, as seen at 60. The conduit portions 59 above the casing 16 merge into a single conduit 61 having an outlet end which opens into a housing 62 of a control valve, designated generally 63, which will hereinafter be described in detail. The conduit portions 59 combine with the spring 50 to support the backwash chamber 45 and to permit it to move radially toward and away from the strainer 38. The conduit portions 59 thus constitute a part of the conduit 61 as does the backwash chamber 45 which forms the inlet end of said conduit.

A housing 64 is mounted on and secured to the top wall 21 by fastenings 65 and is provided with a bearing 66 for journaling the upper end of the shaft 33, which is disposed in said housing. A ratchet wheel 67 is keyed to an upper reduced portion 33a of the shaft 33. A hub 68 is loosely disposed on the shaft portion 33a above the ratchet wheel 67 and is journaled for rotation relatively to the shaft portion 33a by a bushing 69. A lever 70 is fixed to and projects radially from the hub 68 through a circumferentially elongated opening 71 in the side wall of the housing 64, in which the lever 70 is swingably disposed. A spring means 72, as best illustrated in Figure 2 urges the lever 70 and the hub 68 to turn counterclockwise as seen in Figure 2. Another portion of the hub 68 is provided with a series of teeth formed in the periphery thereof, forming a gear segment 73 which meshes with a segment-shaped series of teeth 74 formed in the free end of a lever 75. The lever 75 is pivotally mounted at its opposite end at 76 in a part of the housing 64 for swinging movement in a plane parallel to the plane of the ratchet wheel 67. A shaft 77 extends perpendicularly through the intermediate portion of the lever 75 and is journaled therein. A pawl 78 is fixed to the shaft 77 below the lever 75 and extends laterally thereof to engage the teeth of the ratchet wheel 67, all of which teeth face counterclockwise, as seen in Figure 2. An arm 79 is fixed to and projects from the upper end of the shaft 77, radially thereof. A contractile spring 80 urges the arm 79 and shaft 77 to swing clockwise, as seen in Figure 2, to retain the pawl 78 in engagement with the teeth of the ratchet wheel 67 and to permit said pawl to ride over the inclined surfaces of said teeth when the lever 75 is swung clockwise. A power unit casing 81 is secured to and supported by the housing 64 and has a tapered end 82 extending into said housing through an opening 83 in the housing side wall. A diaphragm 84 is secured in the casing 81 and divides said casing into end portions including a chamber 85 which is located remote to the casing end 82. A rod 86 is secured to the central portion of the diaphragm 84 and projects therefrom away from the chamber 85 and extends slidably through the casing end 82. The opposite end of the rod 86 is pivotally connected to one end of a link 87 which is pivotally connected at its opposite end to a lug 88 which projects radially from the hub 68 and is circumferentially spaced from the lever 70 and gear segment 73.

Referring to Figures 2, 3 and 4, the valve housing 62 includes an intermediate chamber 89 into which the conduit 61 opens, an upper chamber 90 and a lower chamber 91. Said chambers are separated by annular partitions 92 and 93 having openings 94 provided with upwardly facing beveled valve seats 95. A valve stem 96 extends slidably through the housing 62 and is guided for sliding movement axially thereof. The upper end of the stem 96 projects upwardly from a stuffing box 97. An upper valve 98 and a lower valve 99 are secured to the stem 96 to simultaneously seat on the valve seats 95 or to be elevated relatively thereto, and the upper valve 98 is adjustably mounted on the stem by a threaded connection 100.

As seen in Figure 4, a T connection 101 taps into the chamber 89 and has a branch pipe 102 leading therefrom and which is tapped into the diaphragm chamber 52. Said chamber having an additional, normally closed fitting 103 at its opposite side enabling the pipe 102 to be tapped into either side thereof by interchanging the pipe 102 and fitting 103. Another branch conduit 104 extends upwardly from the coupling 101 and is connected at its opposite end to the casing 81 and opens into its chamber 85. As seen in Figure 2, the conduit 104 adjacent the chamber 85 is divided into two, subsequently merging conduit portions 105 and 106. The supply portion 105 includes a check valve 107 which opens toward the chamber 85 and the return conduit portion 106 includes a check valve 108 which opens away from the chamber 85. Each of the conduit portions 105 and 106 additionally includes a conventional cock 109 for manually adjusting and regulating the flow of a liquid under pressure through the conduit portions 105 and 106, for a purpose which will hereinafter become apparent. The check valves and cocks are more clearly illustrated in Figures 11 and 12.

As best seen in Figure 1, a discharge conduit 110 has branch portions 111 constituting one end thereof which open into the upper chamber 90 and lower chamber 91 and the opposite end of said conduit 110 is adapted to open to the atmosphere as for example into a sewer or any other outlets which will afford no resistance to discharge.

As seen in Figure 1, a base plate 112 is suitably secured to a portion of the top wall 21 and is provided with spaced upstanding posts 113 between which is disposed an upstanding post 114 having a sleeve 115 at its upper end. A rod 116 extends slidably through aligned bores 117 in the upper portions of the posts 113 and loosely through the sleeve 115 which is disposed therebetween. A sleeve member 118 is slidably disposed in the guide sleeve 115 and is loosely disposed around the rod 116. The guide sleeve 115 has a slot 119 extending from end-to-end thereof and opening inwardly and toward the housing opening 71 to slidably accommodate a lug 120 and portions of a pair of arms 121 and 122 which are fixed to and project from the sleeve member 118 and which are disposed in longitudinal alignment. The lug 120 is connected by a pin and slot connection 123 to the free end of the lever 70 to cause the sleeve member 118 to slide through the guide sleeve 115 when the lever 70 is oscillated. The arms 121 and 122 each project outwardly and thence longitudinally away from the ends of the sleeve and in directions away from one another. A pair of annular stop members 124 are threaded one into each end of the sleeve member 118 to form stops for a pair of washers 125 which are slidably mounted on the rod 116 and which are slidably disposed in the sleeve member 118 but which are prevented from passnig through the ends thereof by the stop members 124. An expansion coiled spring 126 is disposed on the rod 116 between the washers 125 and said washers are disposed between a pair of collars 127 and 128 which are adjustably secured to the rod 116 and sized to pass through the openings of the stop members 124. Beyond the collars 127 and 128, the rod 116 is provided with a pair of notches 129 and 130, respectively, each having an inwardly facing shoulder. A pair of spring urged pawls 131 and 132 for engagement respectively with the notches 129 and 130, are pivotally mounted on the posts 113 and are spring urged toward the rod 116. The arms 121 and 122 extend across extensions 133 of said pawls and are provided with laterally turned terminals 121a and 122a to engage the pawl extensions 133 for disengaging the pawls from the notches.

As seen in Figure 1, a bearing block 134 is secured to and disposed above the top wall 21 and has an elongated pinion 135 journaled therein and which meshes with a pair of racks 136 and 137 which extend slidably through the bearing block 134 in offset, crossed relationship to one another. The rack 137 has a lower end which is fixed to the upper end of the valve stem 95 and the rack 136 has a rod 138 projecting from its inner end and which extends into a socket 139 formed on an end of the rod 116 disposed adjacent said rod 138. The rod 138 is normally held against passing through the detachable outer end of the socket 139 by a collar 140 which is secured thereto. An expansion spring 141 is mounted in the socket 139 and bears against the collar 140 to normally retain the rods 116 and 138 in their extended positions of Figure 9.

Assuming that water is entering the casing 16 through its inlet 42 under pressure, this water, not shown, will fill the chamber 24 and the connected chamber 44 and provided that water is being used from service outlets supplied with water by cleaned water outlet 29; the water will pass through strainer 38 and dirt, et cetera, will be removed from the water entering within strainer 38. It is generally known that the total area of the apertures of the screen should be several times the area of the supply and discharge areas so that the screen will not impose any restriction to the passage of water.

The water pressure within chamber 44 impinges against the diaphragm 55 at all times so as to force it inwardly of the chamber 52, but an equal pressure exists within chamber 52 when valve 62 is closed as in Figure 1 so that diaphragm 55 is under two opposite and almost equal pressures so that spring 50 will retract backwash chamber 45 as shown in Figure 14.

Oppositely, when the valve 62 is opened little or no pressure exists within the diaphragm chamber 52 and pressure existing in chamber 44 will move diaphragm 55 inwardly of diaphragm chamber 52, since outward pressure on diaphragm 55 has been relieved by water flowing from chamber 52 through connection 102 and branch 104, into and through valve 62. This motion of diaphragm 55 through rod 56 will exert a pull against yoke 48, thereby overcoming the lesser retractive pull of spring 50, for moving backwash chamber 45 toward and against strainer 38 with gasket 47 disposed tightly against a segment of strainer 38 as shown in Figure 5. This action occurs immediately following the opening of valve 62.

Assuming that valve 62 has opened and backwash chamber 45 is now seated against screen 38, a high pressure exists within strainer 38, but exteriorly of the segment of the strainer covered by backwash chamber 45 and sealed by gasket 47 little or no pressure exists and the reverse flow of cleaned water through the screen 38 will clean the openings of screen 38 of any dirt that has been deposited therein. This dirt being carried off with the backwash water through chamber 45, thence through conduits 59 and conduit 61 to valve 62 and through valve 62 to connections 111 and 110 and thence to sewer disposal.

Also with the opening of valve 62 the pressure in diaphragm chamber 85 will be relieved by flow outwardly through conduit 106, check valve 108, conduit 104, branch 101, and through valve 62 and thence to sewer disposal. The rate of this return flow will be governed by the cock 109 of the branch 106. As this occurs the spring means 72 will swing the lever 70 and hub 68 counterclockwise on the shaft portion 33a, as seen in Figure 2, to thereby return the lever 75 to its position of Figure 2 by a clockwise swinging movement and the pawl 78 will override more than one tooth but not as much as two teeth, of the ratchet wheel 67. During this swinging movement under the action of the spring means 72 the sleeve 118 will slide to the right on the rod 116 which is held by the pawl 131 engaging the notch 129 and the spring 126 will be compressed against the collar 128, as illustrated in Figure 9. As the parts approach their positions of Figure 2, the arm terminal 121a will strike the extension 133 of pawl 131 to rock said pawl out of engagement with the notch 129 so that the spring 126 can rapidly move the rod 116 from left to right from its position of Figure 9 to its position of Figure 2. This will cause the rack 136 to move from left to right thus turning pinion 135 clockwise as seen in Figure 1 to displace the rack 137 and stem 96 downwardly to close the valve elements 98 and 99. The spring 131 permits a slight travel of the rod 116 to the right relatively to the rod 138 after the valve elements have closed to insure sufficient movement of the notch 130 into a position to be engaged by the pawl 132. Immediately following the closing of valve 62, as shown in Figures 1 and 4, pressures will rise in diaphragm chambers 52 and 85, by flow of water from intermediate valve chamber 89, through the coupling 101 and branch 102 into the first diaphragm chamber 52 and through the conduit 104 toward the diaphragm casing 81 and into the chamber 85 thereof past the check valve 107, first to the pressure existing within strainer 38 and secondly, when backwash chamber is slightly withdrawn from surface of the screen 38, to the pressure existing within chamber 44. The water pressure within chamber 52 being equal, or nearly equal, with the pressure existing in chamber 44, the forces acting upon diaphragm 55 are balanced, so that spring 50 will retract backwash chamber 45 as shown in Figure 1. This will occur before motion of lever 75 and pawl 78 will move ratchet wheel 67 (since pawl 78 had on the return travel overrun one ratchet tooth, but not reached two). Also because the flow to chamber 85 is restricted by the cock 109 in the branch 106 and said diaphragm is additionally held against outward movement by the pressure of the spring means 72. Gasket 47 then surrounds another portion of the strainer to be cleaned. The operation previously described is then repeated. It will be obvious that the number of the operations accomplished each minute or in any other time interval may be manually regulated by adjustment of the cocks 109.

It will also be apparent that an auxiliary supply of liquid under pressure controlled by operation of the rod 116 may be utilized for supplying pressure to the chamber 85 if the backwash pressure is inadequate for this purpose.

Various modifications and changes are contemplated and may obviously be resorted to, without departing from the spirit or scope of the invention as hereinafter defined by the appended claims.

I claim as my invention:

1. A water cleaning apparatus comprising a casing adapted to be interposed in a supply line containing water under pressure, a cylindrical strainer rotatably mounted in said casing and interposed between the inlet and outlet of the casing through which the water is adapted to pass inwardly between an inlet and an outlet of the casing for removing dirt and foreign matter therefrom, a backwash chamber disposed within the casing externally of the strainer, supporting means connected to the casing and backwash chamber and urging said backwash chamber out of engagement with the strainer, a first diaphragm unit mounted in and fixed to the casing including a diaphragm connected to said chamber and responsive to the pressure within the casing for urging and retaining the backwash chamber in engagement with a portion of the strainer and against the action of the supporting means, said backwash chamber having an open side engaging against the strainer through which a portion of the cleaned water backwashes outwardly through the strainer into said chamber for cleansing the strainer portion in registration with the backwash chamber, a conduit connected to the backwash chamber for carrying off the backwash liquid therefrom, a first branch conduit connected to said conduit and to the first diaphragm chamber, a second diaphragm chamber, a second branch conduit connecting the second diaphragm chamber to said conduit, a drainage conduit opening to the atmosphere and connected to said first mentioned conduit, a valve for closing the communication between the first mentioned conduit and drainage conduit, a second diaphragm actuated by the pressure in the second diaphragm chamber and forming a part of said chamber, an intermittent driving means connecting said second diaphragm to the strainer for intermittently turning the strainer in one direction when the second diaphragm is extended, spring means for moving the driving means in the opposite direction when the pressure is diminished in the second diaphragm chamber, and valve actuating means connecting said valve to the driving means and operative upon movement of the driving means by the second diaphragm for opening the valve to release the backwash liquid from said conduit and the first and second branch conduits, said valve actuating means operating to close the valve when the driving means is actuated by the spring means.

2. A water cleaning apparatus as in claim 1, and a shaft journaled in a portion of the casing having one end secured to a portion of the strainer and another portion thereof being connected to the driving means for rotation of the shaft with the driving means when the driving means is actuated by the second diaphragm.

3. A water cleaning apparatus as in claim 1, said backwash chamber having a face surrounding its open side of arcuate curvature conforming to the curvature of the strainer, and an uninterrupted sealing gasket projecting from said face and engaging the periphery of the strainer when the backwash chamber is in a projected position, the backwash pressure in said first diaphragm chamber, when the valve is in a closed position, building up to counterbalance the pressure in the casing to permit the supporting means of the backwash chamber to retract said chamber away from and out of engagement with the strainer.

4. A water cleaning apparatus as in claim 3, and means restricting the flow through the second branch conduit to the second diaphragm chamber whereby the backwash chamber is retracted before the strainer is turned by said driving means.

5. A water cleaning apparatus as in claim 4, said restrictor means comprising a manually regulated cock for restricting the flow to and from the second diaphragm chamber for regulating the rate of operation of the driving means.

6. A water cleaning apparatus as in claim 1, said valve actuating means including a spring loaded delayed action unit released for operation as the driving means approaches each extremity of its movement for delaying the opening and closing of the valve and for rapidly moving the valve between its opened and closed positions.

7. In a water cleaning apparatus, a casing adapted to be interposed in a supply line containing water under pressure, a strainer rotatably mounted in said casing and disposed around an outlet thereof whereby the water passes inwardly through the strainer from an inlet of the casing to said outlet, driving means connected to and intermittently rotating the strainer, a conduit having an inlet end disposed within said casing externally of and opening toward said strainer for supplying water under pressure to said driving means to actuate the driving means for turning the strainer, supporting means connecting the inlet of said conduit to a part of the casing for movement of the inlet toward and away from the strainer, said supporting means urging the inlet out of engagement with the strainer, a pressure responsive means rigidly mounted in said casing externally of the strainer including a pressure responsive element connected to the conduit inlet and responsive to the pressure within the casing for displacing the opening of the inlet into engagement with a portion of the strainer, said conduit having an outlet opening to the atmosphere, valve means interposed in said conduit and actuated by said driving means for intermittently opening said conduit outlet to release the pressure from said conduit whereby the pressure within the strainer will cause the water therein to backwash outwardly through the portion of the strainer surrounded by the conduit inlet and into said conduit for cleansing said strainer portion, said conduit having a branch conduit communicating with said pressure responsive means, said pressure responsive means including a chamber into which said branch conduit opens having a wall portion formed by said pressure responsive element, a portion of the water from the inlet of the conduit entering said chamber of the pressure responsive means, when the valve is in a closed position, for equalizing the pressure on opposite sides of said pressure responsive element whereby the conduit inlet is moved out of engagement with the strainer by said supporting means, the opening of said valve interrupting operation of said driving means and releasing the pressure from the conduit and from the chamber of the pressure responsive means whereby the conduit inlet is moved into engagement with the strainer by the casing pressure on said pressure responsive element, and mechanical means for returning the valve to a closed position to cause the driving means to be again actuated by the pressure within the conduit for turning the strainer after the conduit inlet has been displaced out of engagement with the strainer by a recharging of the pressure responsive chamber.

8. In a water cleaning apparatus including an intermittently rotated strainer disposed for rotation in a casing which is interposed in a flow line whereby a liquid under pressure passes from an inlet of the casing inwardly through the strainer and thence outwardly of the casing through an outlet thereof, a conduit having a large inlet portion disposed within the casing externally of the strainer, means movably supporting the conduit inlet within the casing and out of engagement with said strainer, a pressure responsive member mounted within and fixed to the casing and in communication with another portion of said conduit, said pressure responsive member including an element connected to said inlet portion and actuated by the pressure within the casing for displacing the conduit inlet into engagement with the strainer, a valve controlling said conduit for releasing the pressure therefrom to the atmosphere when the valve is in an open position, the pressure within said conduit and pressure responsive means counterbalancing the casing pressure on said element whereby the conduit inlet is maintained out of engagement with the strainer by said conduit inlet supporting means when the valve is in a closed position, and said valve when in an open position relieving the conduit pressure from said pressure responsive means to permit the casing pressure to actuate said element to displace the conduit inlet into engagement with a portion of the outer side of the strainer and to relieve the pressure from within the conduit inlet whereby the pressure of the water within the strainer will cause a portion of the water to backwash outwardly through the strainer portion surrounded by said conduit inlet and into said inlet and conduit for cleansing said strainer portion, and mechanically actuated means connecting said valve to the intermittently actuated strainer whereby the valve is opened when rotation of the strainer is interrupted and closed when the strainer is revolved.

9. A water cleaning apparatus as in claim 8, and a pressure responsive driving means connected to said conduit for intermittently imparting rotation to the strainer including said mechanical means for intermittently moving the valve to a closed position or an open position.

10. In a water cleaning apparatus, a casing adapted to be interposed in a flow line containing water under pressure, an intermittently driven revolving filter screen mounted in said casing through which the water passes from an inlet of the casing inwardly through the screen to the casing outlet for filtering the water, a conduit extending from said casing having an outlet end opening to the atmosphere, a valve for shutting said conduit outlet, means forming a connection between the valve and filter screen and causing the valve to be operated in synchronized relationship to the intermittent rotary movement of the filter screen whereby said valve is closed when the filter screen is in motion and is open when the filter screen is immobile, said conduit having a relatively large inlet end disposed within said casing externally of the filter screen and opening toward said filter screen, said conduit inlet end forming a backwash chamber and being movably disposed in the casing for movement toward and away from the filter screen, means connecting the backwash chamber and casing and urging the backwash chamber out of engagement with the filter screen, means mounted in said casing and connected to the backwash chamber including an element responsive to the pressure within said casing for displacing the backwash chamber into engagement with the screen when the screen is immobile and said valve is opened whereby the water will backwash outwardly through the screen portion surrounded by the opening of the backwash chamber into the conduit for cleansing the screen portion surrounded by said backwash chamber opening, and means disposed within said casing communicating with and responsive to the pressure within the conduit when said valve is closed for exerting a counterbalancing pressure on said casing pressure responsive element and cooperating with the backwash chamber supporting means for displacing the backwash chamber away from and out of engagement with the filter screen.

LAURENCE B. GILCREST.

References Cited in the file of this patent

UNITED STATES PATENTS

| Number | Name | Date |
| --- | --- | --- |
| 1,591,821 | Heaton | July 6, 1926 |
| 1,768,314 | Folta | June 24, 1930 |
| 1,950,466 | Wille et al. | Mar. 13, 1934 |
| 2,084,955 | Haught | June 22, 1937 |